United States Patent [19]
Watters et al.

[11] Patent Number: 5,628,096
[45] Date of Patent: May 13, 1997

[54] BUTTON TYPE STRAP FASTENER AND METHODS OF MAKING AND USING SAME

[75] Inventors: Charles H. Watters, Godley; Richard G. Voth, Euless; James A. Jennings, Azle, all of Tex.

[73] Assignee: Dayco Products, Inc., Dayton, Ohio

[21] Appl. No.: 551,605

[22] Filed: Nov. 1, 1995

[51] Int. Cl.⁶ .................. A41F 1/00; A44B 1/00
[52] U.S. Cl. .................. 24/580; 24/104; 24/666; 24/701
[58] Field of Search .................. 24/580, 666, 701, 24/90.5, 114.4, 30.5 P, 104

[56] References Cited

U.S. PATENT DOCUMENTS

| | | | |
|---|---|---|---|
| 1,261,835 | 4/1918 | Martin | 24/666 |
| 1,709,181 | 4/1929 | Matlock | 24/580 |
| 1,891,637 | 12/1932 | Frank | 24/666 |
| 2,423,535 | 7/1947 | Welter | 24/104 |
| 3,467,427 | 9/1969 | Moberg | 24/30.5 P |
| 3,938,587 | 2/1976 | Vian | 165/76 |
| 4,271,999 | 6/1981 | Stravitz | 24/666 |

*Primary Examiner*—Victor N. Sakran
*Attorney, Agent, or Firm*—Joseph V. Tassone

[57] ABSTRACT

A button type strap fastener, a method of making same, and a method of using same are provided. The strap fastener includes a mounting strap that is provided with cogs, and also includes a locking button that is adapted to be held in place on the cogs of the mounting strap. The locking button comprises a central opening having a keyhole-shaped configuration, including a first opening portion that corresponds approximately to the greatest diameter of the cogs to receive same such that the mounting strap is displaceable in opposite directions in the first opening portion, and a second opening portion that communicates with the first opening portion and at least in part corresponds approximately to the smallest diameter of the cogs to receive same from the first opening portion in a locking manner.

17 Claims, 2 Drawing Sheets

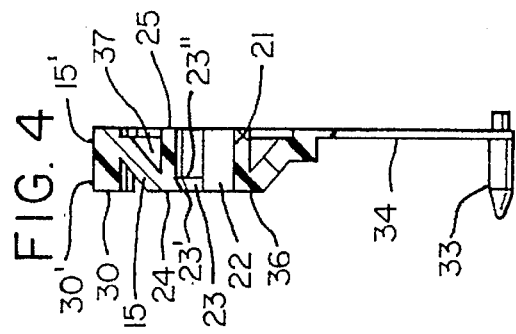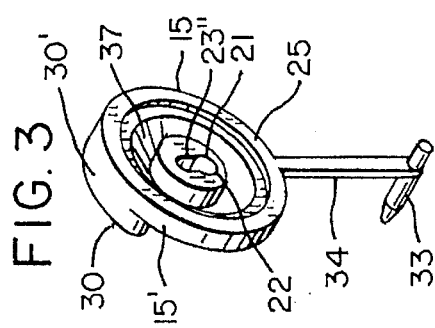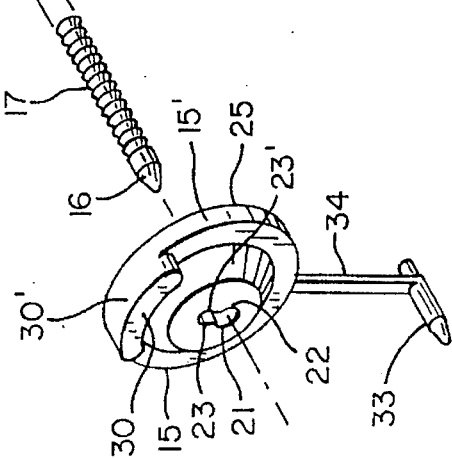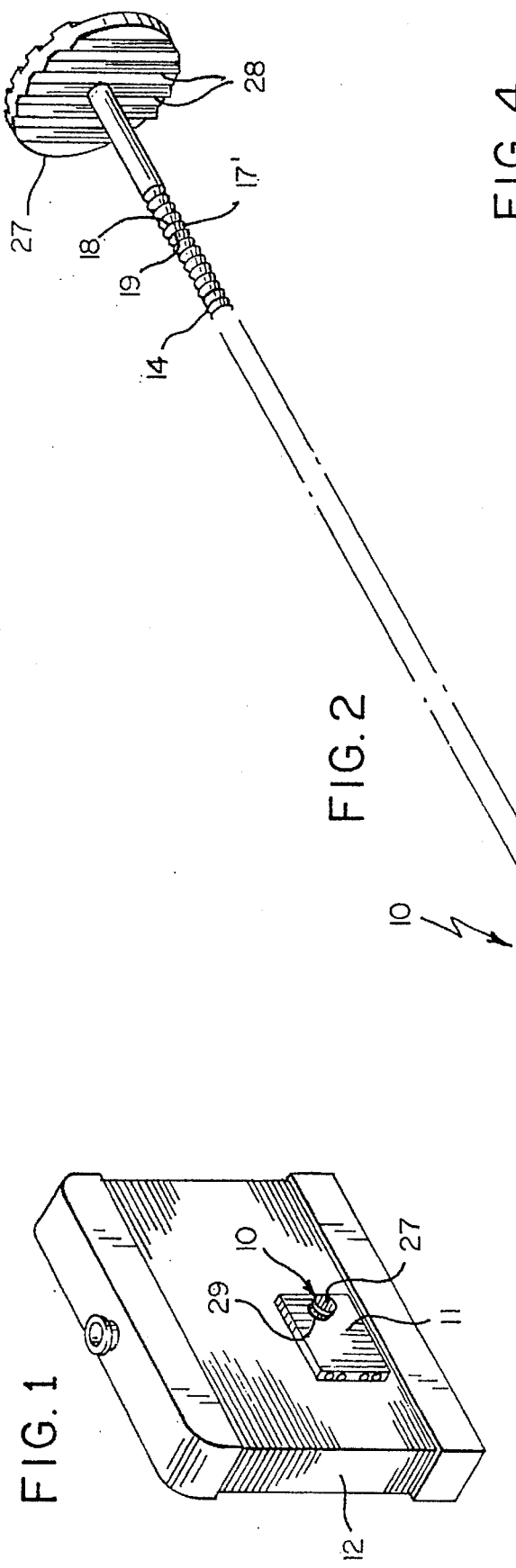

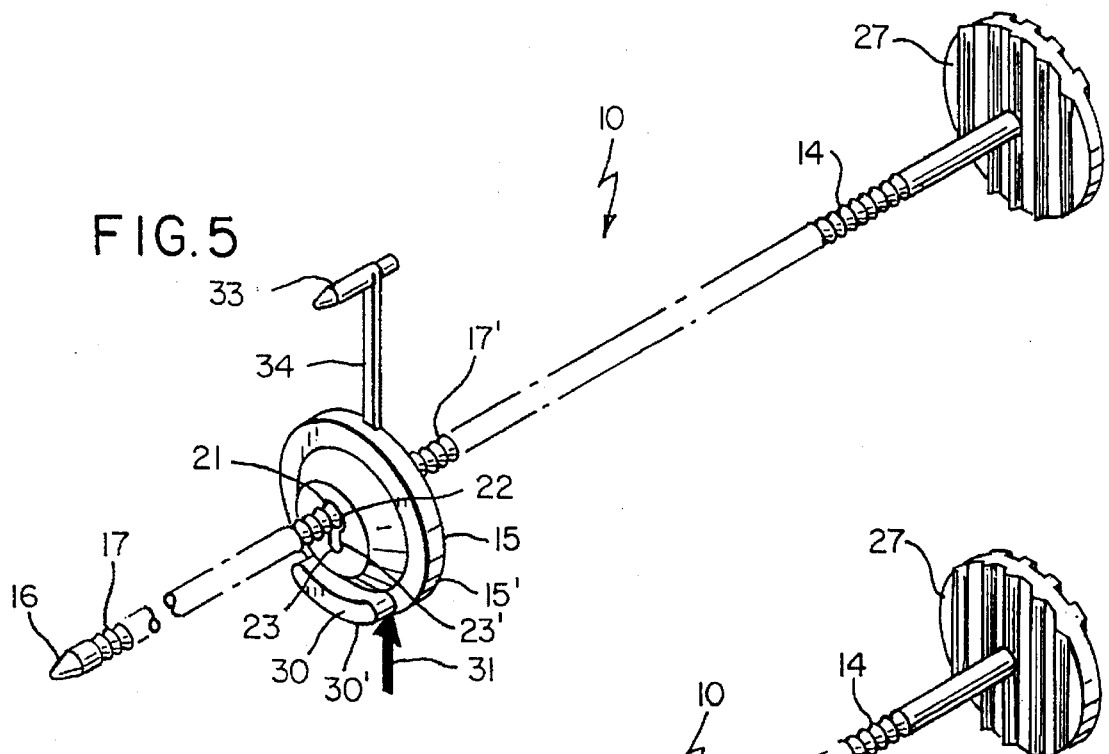
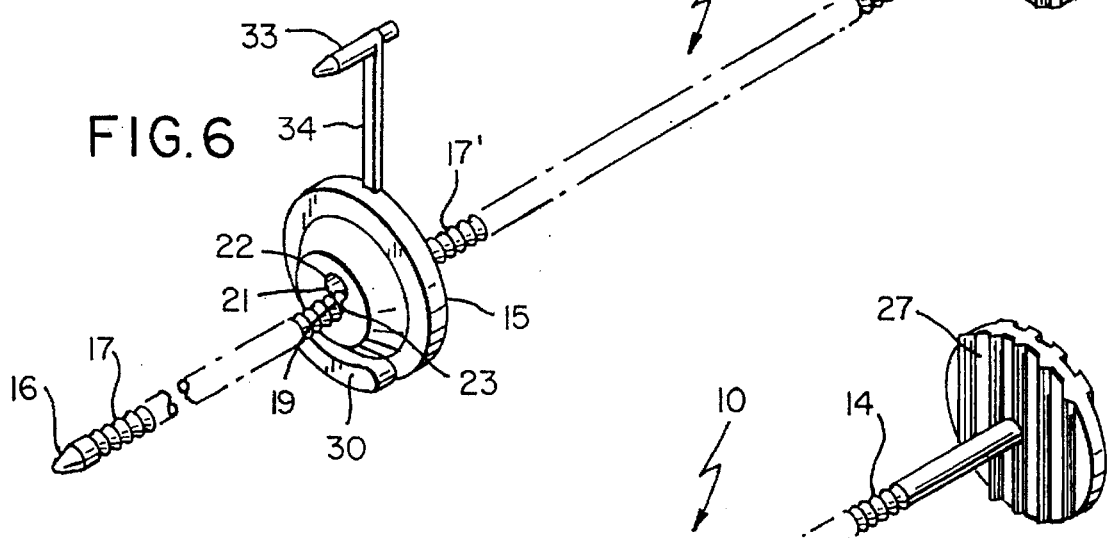
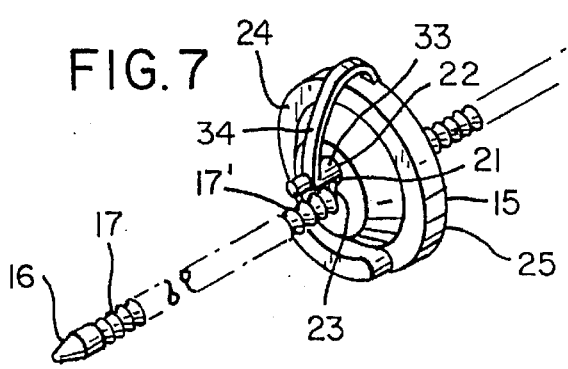

BUTTON TYPE STRAP FASTENER AND METHODS OF MAKING AND USING SAME

BACKGROUND OF THE INVENTION

1. Field of the Invention

This invention relates to a new button-type strap fastener, such as for mounting a transmission oil cooler and/or an auxiliary electric cooling fan to an automobile radiator, as well as to methods of making and using such a strap fastener.

2. Prior Art Statement

It is known to provide a button type strap fastener including a mounting strap that is provided with cog means, and also including a locking button that is adapted to be held in place on the cog means of the mounting strap. For example, see U.S. Pat. No. 3,938,587, Vian. In such prior art strap fasteners, of which Vian is typical, the mounting strap is either flat with rack-type cog means on opposite sides of the strap, or is round and is provided with relatively flat barbs. In either case, the nut or locking button has a hole in the middle with latch means in the form of a pawl or tangs that allow movement of the locking nut in a direction toward the head of the strap, but prevent backing off of the nut, so that once the locking nut has been placed on the mounting strap, the strap fastener can be removed only by destroying the same.

SUMMARY OF THE INVENTION

It is therefore an object of the present invention to provide a button-type strap fastener that has a unique locking feature whereby the locking button can be removed from the mounting strap to allow reuse of the strap fastener, while at the same time improving the strength of the locking connection between the locking button and the mounting strap.

This object is realized pursuant to the inventive button-type strap fastener in that the locking button comprises central opening means having a keyhole-shaped configuration, including a first opening portion that corresponds approximately to the greatest diameter of the cog means of the mounting strap to receive the cog means such that the mounting strap is displaceable in opposite directions in said first opening portion, and a second opening portion that communicates with the first opening portion and at least in part corresponds approximately to the smallest diameter of the cog means to receive same from said first opening portion in a locking manner.

Accordingly, it is an object of this invention to provide a novel button type strap fastener having one or more of the novel features of this invention as set forth above or hereinafter shown or described.

Another object of this invention is to provide a new method of making such a button type strap fastener, the method of this invention having one or more of the novel features of this invention as set forth above or hereinafter shown or described.

Yet another object of this invention is to provide a new method of securing a first object to a second object utilizing the inventive button type strap fastener, such a method having one or more of the novel features of this invention as set forth above or hereinafter shown or described.

Other objects, uses and advantages of this invention are apparent from a reading of the specification in conjunction with the accompanying schematic drawings, which form a part thereof and wherein:

BRIEF DESCRIPTION OF THE DRAWINGS

FIG. 1 is a perspective view showing the strap fastener of this invention being used to secure an oil cooler to a radiator;

FIG. 2 is an exploded perspective view illustrating one exemplary embodiment of the button-type strap fastener of this invention.

FIG. 3 illustrates the back side of the locking button of FIG. 2;

FIG 4 is a cross-sectional view through the locking button of FIG. 2;

FIG. 5 illustrates a first step of placing the locking button on the mounting strap;

FIG. 6 shows the step of initially locking the locking button onto the mounting strap; and FIG. 7 illustrates the step of further locking the locking button onto the mounting strap with the locking pin.

DESCRIPTION OF PREFERRED EMBODIMENTS

While the various features of this invention are hereinafter illustrated and described as being particularly adapted for mounting a transmission oil cooler to an automobile radiator, it is to be understood that the various features of this invention can be utilized singly or in various combinations thereof to provide securing means for other applications.

Therefore, this invention is not to be limited to only the embodiment illustrated in the drawings, because the drawings are merely utilized to illustrate one of the wide variety of uses of this invention.

Referring now to FIGS. 1 and 2, the new button-type strap fastener of this invention is generally indicated by the reference numeral 10, and is shown in FIG. 1 being used to mount a transmission oil cooler 11 to an automobile radiator 12. Although to facilitate illustration only a single inventive button type strap fastener 10 is shown in FIG. 1, in practice a plurality of such strap fasteners 10, and preferably four such fasteners, would typically be used.

The exploded view of FIG. 2 shows that the button-type strap fastener 10 of this invention essentially comprises the mounting strap 14 and the locking button 15. The mounting strap 14 has a tapered end 16 to facilitate insertion through, for example, the fins of an oil cooler and/or a radiator when such cooler is mounted on the radiator. The mounting strap 14 is furthermore provided with cog means 17 to facilitate locking of the locking nut or button 15 in place on the mounting strap 14, as will be discussed in detail subsequently. The cog means 17 have a one-way barbed configuration that also facilitates insertion of the mounting strap 14 through the objects that are to be secured together. Due to the barbed configuration of the cog means 17, the cog means have a larger diameter 18 at the outer tips of the barbs 17' and a smaller diameter 19 at the base of the barbs 17', again for a purpose that will be discussed in greater detail subsequently.

To realize the objects of the present invention, the locking button 15 has a unique configuration. In particular, the locking button 15 is provided with central opening means 21. Such central opening means has a keyhole-shaped configuration, including a larger first opening portion 22 having a diameter that corresponds approximately to the larger diameter 18 of the outer tips of the barbs 17' of the cog means 17, and a smaller second opening portion 23 having a diameter that at least in part corresponds approximately to the smaller diameter 19 at the base of the barbs 17' of the cog means 17. The central opening means 21 is approximately centered in the locking button 15, and extends from one side 24 of the locking button 15 to the other side 25 thereof (see FIG. 4). In the illustrated embodiment, on the side 24 of the locking button 15, it can be seen that the leading edge 23' has a smaller diameter that corresponds approximately to the smaller diameter 19 at the base of the barbs 17', whereas continuing in a direction away from the side 24 the second opening portion 23 tapers out to a larger diameter portion 23" that corresponds approximately to the larger diameter 18 of the outer tips of the barbs 17', all for a reason to be discussed in detail subsequently.

The manner of utilizing the inventive strap fastener 10, with its unique double lock feature, will now be explained in conjunction with the illustrations of FIGS. 5–7. After the objects that are to be held together are placed against one another, one of the inventive mounting straps 14 is inserted through the objects until the head 27 of the mounting strap 14 comes to rest against the first object. In this connection, the head 27 of the mounting strap 14 may be provided with ribs 28 to facilitate placement of the head 27 against, for example, the fins of the oil cooler 11 illustrated in FIG. 1. To further facilitate such placement and holding of the head 27 in position, the ribs 28 of the head 27 may have a triangular cross-sectional configuration. It should also be noted that foam pads 29 (FIG. 1), such as pads of expanded polyethylene or polypropylene, can be disposed between the head 27 of the mounting strap 14 and the object, such as the oil cooler 11, to minimize the chance of any damage to the object. Although not shown in FIG. 1, such a foam pad 29 could also be disposed at the other end of the mounting strap 14 between the side 25 of the locking button 15 and the second object, such as the radiator 12, to which the oil cooler 11 is being mounted.

After the mounting strap 14 has been inserted through the objects that are to be secured together, with the tapered end 16 extending out from the objects remote from the head 27, the locking button 15 can now be placed on the mounting strap 14. To accomplish this, the larger first opening portion 22 of the central opening means 21 of the locking button 15 is placed over the tapered end 16 of the mounting strap 14 and subsequently over the cog means 17 of the mounting strap (see FIG. 5). Since the larger first opening portion 22 of the central opening means 21 of the locking button 15 is approximately the same diameter as the larger diameter 18 at the outer tips of the barbs 17' of the cog means 17 of the mounting strap 14, with such larger first opening portion 22 actually having a diameter that is slightly greater than the larger diameter 18, the locking button 15 can be readily moved back and forth along the cog means 17 and hence along the mounting strap 14. As will be described in greater detail subsequently, this displaceability of the locking button 15 along the cog means 17 of the mounting strap 14 allows removal of the locking button 15 from the mounting strap 14 in the event that the objects are to be disconnected, realigned and/or the strap fastener 10 is to be reused.

After the side 25 of the locking button 15 has been moved along the mounting strap 14 until it rests against, for example, the radiator 12, or against a foam pad 29 that has been disposed between the radiator 12 and the side 25 of the locking button 15, the first locking phase can be undertaken. To accomplish this, the installer presses against the push tab 30 of the locking button 15 in the direction of the arrow 31 (FIG. 5), in other words, in a direction perpendicular to the axis of the locking button 15 and hence of the mounting strap 14. This tab 30 is disposed along a portion of the periphery of the locking button 15, and projects in an axial direction from the side 24. As can be seen from FIG. 4, the outer periphery 30' of the push tab 30 is flush with the outer periphery 15' of the locking button 15, thus providing a relatively wide pressing surface for the thumb or finger of an installer. By pressing against the tab 30 in the direction 31, the cog means 17, and hence the mounting strap 14, is snapped into the smaller second opening portion 23 of the central opening means 21, thereby locking the locking button 15 in place on the cog means 17 of the mounting strap 14, as clearly shown in FIG. 6. This is possible because the leading edge 23' of the smaller second opening portion 23 of the central opening means 21 has a diameter that corresponds approximately to the smaller diameter 19 at the base of the barbs 17' of the cog means 17. If the position of the locking button 15 on the mounting strap 14 is not correct, or if the locking button 15 is to be removed from the mounting strap 14 so that the assembly can be disconnected, the locking button 15 is again pressed in a direction opposite to that of the arrow 31 so that the mounting strap 14 is again moved into the larger first opening portion 22 of the central opening means 21, whereupon the locking button 15 can again be displaced along the mounting strap 14 in either direction. It should be noted that whereas the leading edge 23' of the second opening portion 23 catches in the smaller diameter 19 at the base between two adjacent barbs 17' of the cog means 17 to lock the mounting strap 14 in place, the larger diameter portion 23" allows a portion of the mounting strap 14 to be received in line behind the catching leading edge 23' so that the mounting strap can at that location maintain a straight, i.e. non-twisted, position.

If the installer is now satisfied that the locking button 15 is in the correct position on the mounting strap 14, the second locking phase can now be undertaken. To accomplish this, the locking button 15 is provided with a locking tip or pin 33 that is connected to the outer periphery of the locking button 15 on a side thereof remote from the tab 30 by a thin flexible strip 34. In the illustrated embodiment, the locking pin 33 extends from the thin strip 34 in a direction opposite to that of the side 25 of the locking button 15. Since the mounting strap 14 has now been snapped securely into place into the smaller second opening portion 23 of the central opening means 21 of the locking button 15, and since the strip 34 is flexible, the locking pin 33 can be inserted from the side 24 of the locking button into the now free larger first opening portion 22 of the central opening means 21 (see FIG. 7). The locking pin 33 has approximately the same diameter as the diameter of the larger first opening portion 22 of the central opening means 21 (actually, the diameter of the locking pin 33 will be slightly less than that of the opening portion 22 since the barbs 17' of the cog means 17 of the mounting strap 14 will project slightly into the opening portion 22 when the mounting strap 14 is disposed in the smaller second opening portion 23). The locking pin 33 can either be pressed into the first opening portion 22 manually, or a tool such as pliers can be used to securely insert the locking pin snugly into the larger first opening portion 22. Once the locking pin 33 is in place in the first opening portion 22, the locking button 15 can no longer be displaced in a direction opposite to that of an arrow 31, thus remaining locked securely in place on the mounting strap 14. To again be able to move the locking button 15 along the mounting strap 14, either to further tighten the connection or to remove the strap fastener 10, the procedure is merely reversed, with the locking pin 33 first being removed from the larger first opening portion 22 of the central opening means 21, and the locking button 15 then being pressed in a direction opposite to the arrow 31 so that the position illustrated in FIG. 5 is again achieved and the locking button 15 can be freely displaced along the mounting strap 14.

The central opening means 21 and the locking pin 33 of the locking button 15 have already been described in detail. In principle, the locking button 15 could be a flat disk of uniform cross-section from which the tab 30 projects. However, pursuant to the preferred embodiment illustrated in the drawings, and shown in particular detail in the cross-sectional view of FIG. 4, the locking button 15 furthermore has a unique configuration that provides the locking button with greater strength while at the same time saving material. In particular, as can be seen in FIG. 4, a frusto-conical projection 36 extends from the side 24 of the locking button 15. As can be seen, the central opening means 21 of the locking button 15 is disposed approximately, though not necessarily, centrally through the projection 36. In conformity with the shape of the projection 36, a hollowed out portion 37 is provided around the central opening means 21 on the side 25 of the locking button 15. In addition, it can be seen that the tab 30 and the thin strip 34 that connects the locking pin 33 to the locking button 15 are disposed on opposite sides of the locking button. In particular, as can be seen, for example, from FIG. 2, the tab 30 is disposed along a portion of the peripheral surface 15' of the locking button 15 that is disposed closest to the smaller second opening portion 23 of the central opening means 21, whereas the thin strip 34 with its locking pin 33 is disposed along a portion of the peripheral surface of the locking button 15 that is disposed closest to the larger first opening portion 22 of the central opening means 21.

With respect to the formation of the locking pin 33, it should be pointed out that this locking pin, along with the thin strip 34, can be expediently produced during the manufacturing process, such as extrusion, for producing the locking button 15. In particular, the locking pin 33 itself is a portion of the sprue, with the thin strip 34 being the runner.

The inventive button-strap 10, i.e. the mounting strap 14 and the locking button 15, are made of a thermoplastic material selected from the group including polyethylene terephthalate, polybutylene terephthalate, polyetherimide, polyetheretherketone, polyphenolene sulfide, polypropylene oxide, and polyamides, preferably a polyamide known as nylon 6/6. The one-way barbs 17' of the cog means 17 of the mounting strap 14 are tapered in a direction toward the tapered end 16 of the mounting strap, and in the preferred embodiment extend at an angle of approximately 24° relative to the longitudinal axis of the mounting strap. This angle is significantly greater than the angle of the barbs of heretofore known mounting straps, and provides for a particularly secure locking of the locking button 15 on the cog means 17 of the mounting strap 14 when the locking button 15 is pressed in the direction of the arrow 31 shown in FIG. 5 to press the mounting strap 14 into the smaller second opening portion 23 of the central opening means 21 of the locking button 15.

Although variously sized strap fasteners 10 can be utilized pursuant to the teaching of the present invention, pursuant to one embodiment the mounting strap 14 can have a length of 23.6 cm (9.3 inches), with the larger diameter 18 of the barbs 17' at the outer tips of the barbs being 0.356 cm (0.140 inches), while the smaller diameter 19 at the base of the barbs 17' is 0.239 cm (0.094 inches). The head 27 of the mounting strap 14 can have a diameter of 2.54 cm (1.0 inches). The locking button 15 can also have a diameter of 2.54 cm (1.0 inches). The thin strip 34 can have a width of 0.175 cm (0.069 inches), and a thickness of 0.081 cm (0.032 inches). The locking pin 33, which has a tapered end to facilitate insertion into the larger first opening portion 22, can have a maximum diameter of 0.318 cm (0.125 inches), with the larger first opening 22 having a diameter of 0.381 cm (0.150 inches) and the smaller second opening portion 23, i.e., the leading edge 23' thereof, having a diameter of 0.254 cm (0.100 inches). The edges of the locking button 15 can have a thickness of 0.318 cm (0.125 inches) whereas the thickness of the frusto-conical projection 36 can be 0.635 cm (0.250 inches).

As previously discussed, one advantage of the inventive button type strap fastener 10 is that in contrast to the prior art, where the locking button cannot be backed off once it has been placed onto the mounting strap, the locking button 15 of the present invention can be moved back and forth along the mounting strap 14 by means of the larger first opening portion 22 of the central opening means 21. As a result, since the locking button 15 can be backed off and removed from the mounting strap 14, the inventive button type strap fastener 10 is actually reusable. Despite all of these advantages, the inventive button type strap fastener is actually considerably stronger than the prior art strap fasteners. For example, whereas a typical prior art strap fastener will fail at 40 pounds of straight line pull, the inventive strap fastener 10, without even inserting the locking pin 33, will not fail until at least a 70 pound straight line pull has been exerted on the locking button 15. As a matter of fact, tests have shown that the mounting strap 14 will actually break before the locking connection between the locking button 15 and the mounting strap 14 fails.

Thus, it can be seen that this invention not only provides a novel button type strap fastener, but also provides a new method of making such a strap fastener and a method of utilizing the same.

While the forms and methods of this invention now preferred have been illustrated and described as required by the Patent Statute, it is to be understood that other forms and method steps can be utilized and still fall within the scope of the appended claims, wherein each claim sets forth what is believed to be known in each claim prior to this invention in the portion of each claim that is disposed before the term "the improvement", and sets forth what is believed to be new in each claim according to this invention in the portion of each claim that is disposed after the term "the improvement", whereby it is believed that each claim sets forth a novel, useful and unobvious invention within the purview of the Patent Statute.

What is claimed is:

1. In a button type strap fastener including a mounting strap that is provided with cog means, and also including a locking button that is adapted to be held in place on said cog means of said mounting strap, the improvement wherein said locking button comprises central opening means having a keyhole-shaped configuration, including a first opening portion that corresponds approximately to the greatest diameter of said cog means to receive same such that said mounting strap is displaceable in opposite directions in said first opening portion, and a second opening portion that communicates with said first opening portion and at least in part corresponds approximately to the smallest diameter of said cog means to receive same from said first opening portion in a locking manner, said locking button further including a locking pin that is connected to a periphery of said locking button by means of a thin flexible strip, said locking pin being adapted to be received in a wedging manner in said first opening portion when said cog means of said mounting strap is disposed in said second opening portion.

2. A strap fastener according to claim 1, wherein said locking button further includes a tab projecting from a first side of said locking button in the vicinity of a portion of said periphery thereof opposite to where said flexible strip is connected to said periphery of said locking button.

3. A strap fastener according to claim 2 wherein said flexible strip is connected to that portion of said periphery of said locking button that is closest to said first opening portion, and said tab is connected to that portion of said periphery of said locking button that is closest to said second opening portion.

4. A strap fastener according to claim 3, wherein a frusto-conical projection extends from said first side of said locking button, said keyhole-shaped central opening means extending through said projection.

5. A strap fastener according to claim 4 wherein a second side of said locking button is hollowed-out around a portion of said projection that surrounds said keyhole-shaped central opening means.

6. A strap fastener according to claim 4, wherein said mounting strap has a circular cross-sectional configuration in a direction perpendicular to a longitudinal axis thereof, said mounting strap furthermore having a head and cog means in the form of barbs.

7. A strap fastener according to claim 6, wherein said barbs are in the form of one-way barbs that taper in a direction away from said head of said mounting strap.

8. A strap fastener according to claim 7, wherein said tapered portion of said barbs extends at an angle of approximately 24° relative to said longitudinal axis of said mounting strap.

9. A strap fastener according to claim 1, wherein said second opening portion has an edge that corresponds approximately to the smallest diameter of said cog means and that tapers to a larger diameter that corresponds approximately to the greatest diameter of said cog means.

10. In a method of securing a first object to a second object utilizing a button type strap fastener that includes a mounting strap provided with cog means, and also includes a locking button that is adapted to be held in place on said cog means of said mounting strap, and wherein said locking button comprises central opening means having a keyhole-shaped configuration, including a first opening portion that corresponds approximately to the greatest diameter of said cog means to receive same such that said mounting strap is displaceable in opposite directions in said first opening portion, and a second opening portion that communicates with said first opening portion and at least in part corresponds approximately to the smallest diameter of said cog means to receive same from said first opening portion in a locking manner, said locking button further including a locking pin that is connected to a periphery of said locking button by means of a thin flexible strip, the improvement comprising the steps of disposing said mounting strap successively through said first and second objects such that an end of said mounting strap protrudes from said second object, disposing said locking button on said protruding end of said mounting strap via said first opening portion of said locking button, displacing said locking button along said mounting strap to a desired position against said second object, displacing said locking button in a direction perpendicular to an axial direction of said mounting strap until the latter moves from said first opening portion into said second opening portion for a locking connection of said cog means of said mounting strap with said locking button, and disposing said locking pin in a wedging manner in said first opening portion when said cog means of said mounting strap is disposed in said second opening portion.

11. A method according to claim 10, wherein said locking button further includes a tab projecting from a first side of said locking button in the vicinity of a portion of said periphery thereof opposite to where said flexible strip is connected to said periphery of said locking button, and wherein said step of displacing said locking button comprises pressing against said tab in a direction perpendicular to said axial direction of said mounting strap to effect said movement of said mounting strap from said first opening portion into said second opening portion.

12. In a method of making a button type strap fastener that includes a mounting strap that is provided with cog means, and also includes a locking button that is adapted to be held in place on said cog means of said mounting strap, the improvement comprising the step of forming said locking button to have a central opening means that has a keyhole-shaped configuration, including a first opening portion that corresponds approximately to the greatest diameter of said cog means to receive same such that said mounting strap is displaceable in opposite directions in said first opening means and a second opening portion that communicates with said first opening portion and at least in part corresponds approximately to the smallest diameter of said cog means to receive same from said first opening portion in a locking manner, and forming said locking button to include a locking pin that is connected to a periphery of said locking button by means of a thin flexible strip, said locking pin being adapted to be received in a wedging manner in said first opening portion when said cog means of said mounting strap is disposed in said second opening portion.

13. A method according to claim 12, comprising the step of forming said locking button to further include a tab projecting from a first side of said locking button in the vicinity of a portion of said periphery thereof opposite to where said flexible strip is connected to said periphery of said locking button.

14. A method according to claim 13, which comprises the steps of connecting said flexible strip to that portion of said periphery of said locking button that is closest to said first opening portion, and connecting said tab to that portion of said periphery of said locking button that is closest to said second opening portion.

15. A method according to claim 14, comprising the step of forming said locking button to have a frusto-conical projection extending from said first side thereof, said keyhole-shaped central opening means extending through said projection, and forming a second side of said locking button to be hollowed-out around a portion of said projection that surrounds said keyhole-shaped central opening means.

16. A method according to claim 15, comprising the steps of forming said mounting strap to have a circular cross-sectional configuration in a direction perpendicular to a longitudinal axis thereof, providing said mounting strap with a head and cog means in the form of barbs, and forming said barbs as one-way barbs that taper in a direction away from said head of said mounting strap, wherein said tapered portion of said barbs extends at an angle of approximately 24° relative to said longitudinal axis of said mounting strap.

17. A method according to claim 12, comprising the step of extruding said locking button to have a runner of said extrusion process form said thin flexible strip, and to have the sprue of said extrusion process form said locking pin connected to said thin flexible strip.

* * * * *